Nov. 23, 1965 I. BROWN 3,219,913

AUTOMATIC MAINTENANCE CIRCUIT

Filed May 17, 1963 2 Sheets-Sheet 1

IRVING BROWN,
*INVENTOR.*

Harry M. Saragovitz
BY Edward J. Kelly
Herbert Berl
Alfred E. Smith

Nov. 23, 1965 I. BROWN 3,219,913

AUTOMATIC MAINTENANCE CIRCUIT

Filed May 17, 1963 2 Sheets-Sheet 2

IRVING BROWN,
INVENTOR.

BY Harry M. Saragovitz
Edward J. Kelly
Herbert Berl
Alfred E. Smith 3,219,913
Patented Nov. 23, 1965

3,219,913

AUTOMATIC MAINTENANCE CIRCUIT

Irving Brown, Cherry Hill, N.J., assignor, by mesne assignments, to the United States of America as represented by the Secretary of the Army Filed May 17, 1963, Ser. No. 281,374
5 Claims. (Cl. 323—23)

This invention relates to an automatic maintenance circuit and more particularly to an automatic maintenance circuit employing the principle of circuit redundancy.

In the use of many types of electronic equipment it is necessary to maintain a very high degree of reliability. Equipment reliability can be greatly enhanced by making use of the principle of circuit redundancy. Where it can be applied, it makes possible automatic self-detection of a circuit failure, automatic repair and provides a means for remote signaling of what has happened.

It is therefore an object of this invention to provide a circuit that will upon failure of an amplifier section automatically switch to a standby amplifier which replaces the section that has just failed.

Another object of this invention is to provide a circuit with a means for sensing its own failure.

It is a further object of this invention to enhance the reliability of electronic equipment by making use of the principle of circuit redundancy.

According to the present invention, the foregoing and other objects will be more fully apparent from the following detailed description of the invention and from the accompanying drawings, in which.

The present invention attains the foregoing objects by employing circuit redundancy in a manner which contains only the parts necessary for a circuit to operate functionally.

Figure 1:
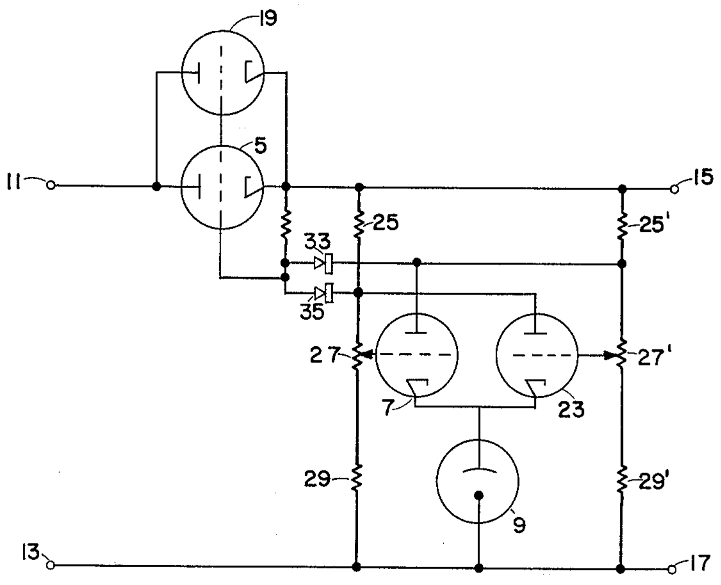
FIGURE 1 is a circuit diagram of an electronic voltage regulator according to the invention.

An electronic voltage regulator according to the invention is shown in FIGURE 1, wherein reference numeral 5 designates a series regulating tube, element 7 is a regulating amplifier and element 9 is a voltage reference tube. Terminals 11 and 13 are connected to the voltage source, and terminals 15 and 17 are connected to the load. This part of the circuit along with the voltage divider formed by resistors 25, 27, and 29 connected to the grid of amplifier 7 comprises the voltage regulator. A second series regulating tube 19 is connected in parallel with tube 5 to increase the reliability of the circuit. This reliability increase occurs in a design where either tube alone can carry full load current. Note, however, that although tube 5 can be paralleled, tube 7 cannot; therefore, an increase in reliability by redundancy in the above manner is denied to a part of the circuit which needs it most. Tube 7 cannot be paralleled because the necessary D.C. operating points could not be maintained However, the regulating amplifier 7 can be cross connected with amplifier 23 and along with a second voltage divider formed by resistors 25′, 27′ and 29′ comprises an Eccles-Jordon type of bistable multivibrator wherein the on tube serves as the amplifier in the regulating loop. Note that either tube 7 or 23 may be the amplifier. Normal design practice is to apportion cross-coupling resistance dividers 25′, 27′ and 29′ to insure that the on tube is saturated, i.e., operating at zero bias. Suppose however, the dividers were designed to allow the on tube to operate below saturation, for example, in a class A amplifier region. Then the on tube would be free to act as an ordinary small signal D.C. amplifier as well as part of the multivibrator. Diodes 33 and 35 pass the amplified signal to the grid of tube 5 from whichever tube happens to be on and isolate the off-tube. As in any flip-flop circuit the "on" tube is determined at turn-on by chance. However, should the "on" tube fail the other tube will turn on automatically and take over operation of the circuit.

In operation, a voltage which is to be regulated is connected between terminals 11 and 13. This voltage is applied to the plates of both series regulating tubes 5 and 19 which are operating in parallel. Should either tube 5 or 19 fail the circuit is so designed that either tube 5 or 19 will carry the full load current applied thereto. Regulation of the voltage applied to a load, connected between terminals 15 and 17, is accomplished by one of two parallel circuits which is selected at turn on by chance.

Assume that amplifier tube 7 is triggered first when the circuit is energized. A reference voltage is provided by voltage reference tube 9 which develops a substantially constant voltage drop over a relatively wide range of current. This reference voltage is balanced against the voltage at the grid of amplifier tube 7; thus, the difference between these voltages can be regarded as an error signal acting between the grid and cathode of tube 7. The output of tube 7 controls the grid potential and hence, the voltage drop of tubes 5 and 19. If tube 7 failed after operating as discussed above, the rise in plate voltage of tube 7 will be reflected on the grid of tube 23 causing it to conduct and take over the operation previously carried out by tube 7.

The above circuit has been described in detail to illustrate a particular application of the philosophy of achieving automatic maintenance by cross-connecting a standby component with an operational component. Two general statements may be made: (1) It is obvious that this technique may be generalized to include any device employing gain, (2) the above circuit achieves one-hundred percent protection with one-hundred percent redundancy. However almost one-hundred percent protection can be obtained with far less redundancy. The first statement is shown schematically in FIGURE 2 wherein amplifiers 37 and 39 have a gain greater than 1. The arrows 36 and 38 indicate cross-coupling.

Figures 2, 3:
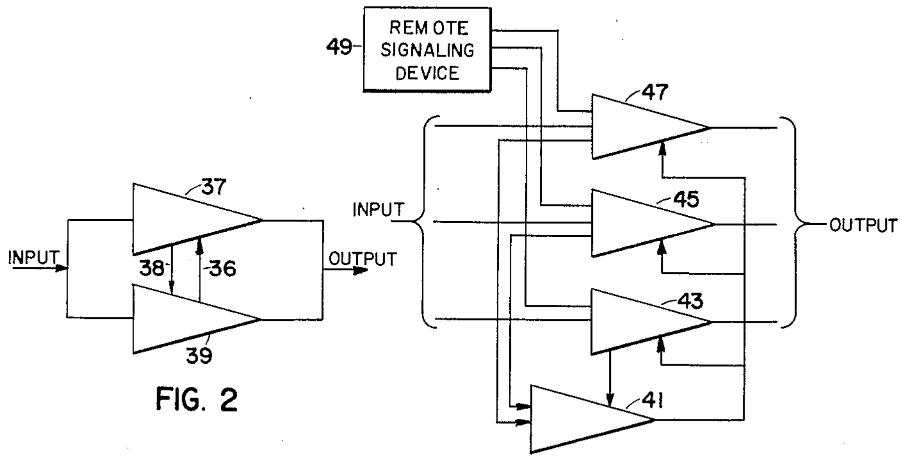
FIGURE 2 is a block diagram showing the interconnection of a pair of amplification stages according to the invention.
FIGURE 3 is a block diagram of a further embodiment of the invention.

The second general statement is indicated by FIGURE 3 which illustrates a further embodiment of the invention. Standby amplifier 41 is cross-connected with amplifiers 43, 45, 47 to automatically switch the standby amplifier 41 into operation replacing either amplifier 43, 45, or 47 which may fail to operate. A remote signaling device 49 is connected to amplifiers 43, 45, and 47 for signaling when a failure has occurred.

Figure 4:
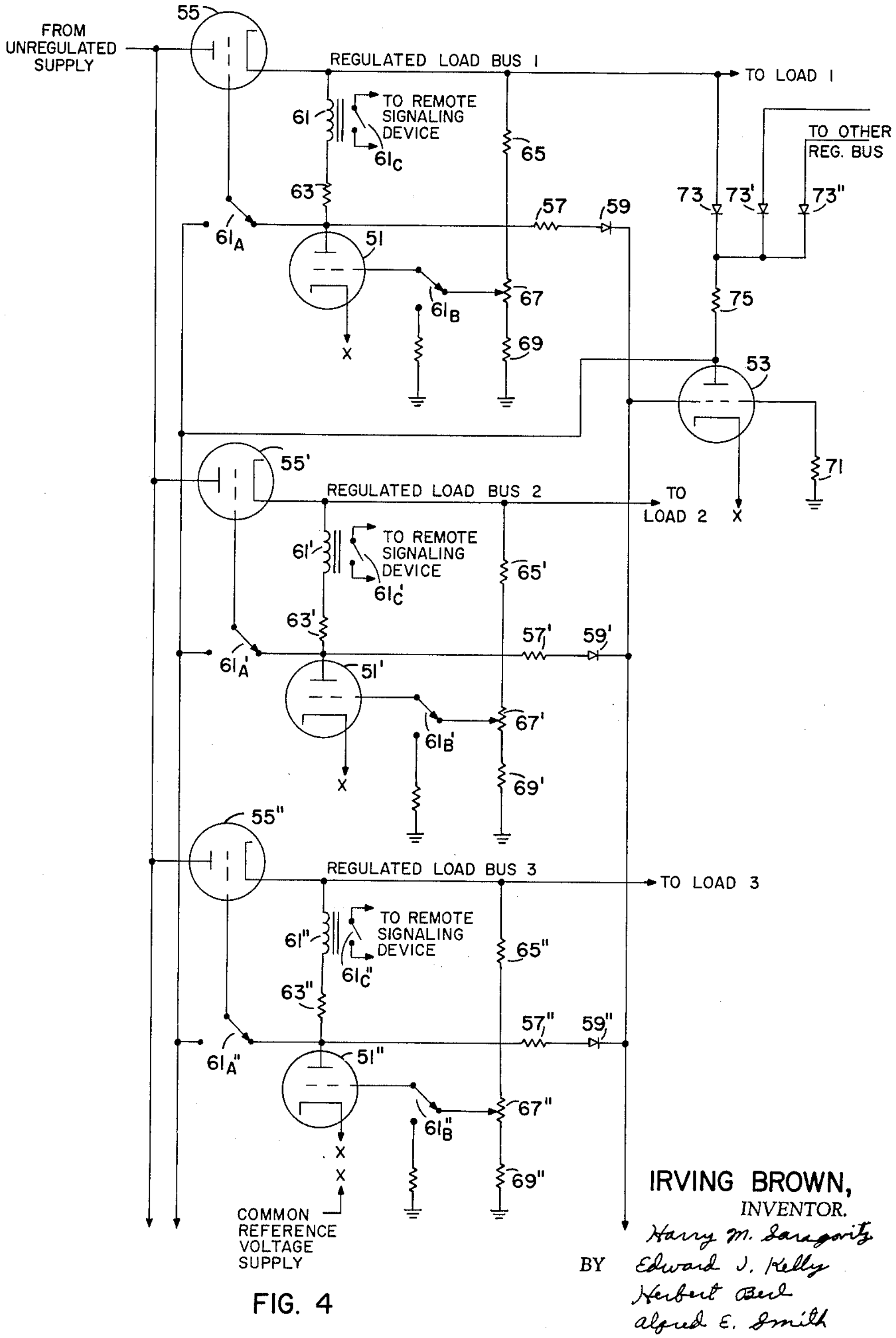
FIGURE 4 is a schematic diagram illustrating electrically the embodiment as defined in FIGURE 3.

Referring now to FIGURE 4 of the drawings in which a plurality of amplifiers 51 are cross connected with a standby amplifier 53 which is placed into operation when one of the amplifiers 51 fails. Tubes 55, 55′, and 55″ are series regulator tubes, each the same as the tube designated 5 in FIGURE 1. Here, a plurality of regulated load buses are supplied through tubes 55 from an unregulated voltage supply. Tubes 51, 51′ and 51″ are the amplifiers for which automatic maintenance is to be provided by the single tube 53. The grid of tube 53 is connected to the plate of each amplifier 51 through resistors 57 in series with diodes 59. The plate of amplifiers 51 are also connected to the grid of associated regulator tubes 55 through a set of normally closed contacts 61$_A$ of relay 61. The plate of standby amplifier 53 is connected to the grid of each of tubes 55 through normally open contacts $61_A$ of relays 61. Relays 61 in series with resistors 63 are connected between the load buses and the plates of tubes 51. The cathodes of amplifiers 51 and standby amplifier 53 are connected to a common reference voltage supply *x*. A voltage divider network consisting of resistors 65, 67, and 69 connected in series is connected one between each regulated load bus and ground potential.

The grid of each amplifier 51 is connected to an adjustable tap on resistors 67 through a normally closed set of contacts $61_B$ of relays 61. The grid of tube 51 is connected to ground potential through a normally open set of contacts $61_B$ of relays 61. The grid of standby amplifier tube 53 is connected to ground potential through a resistor 71 forming a part of a voltage divider network along with resistors 57 and 63. Each of the regulated load buses are connected to a common junction through diodes 73 and the plate of tube 53 is connected to the common junction through a resistor 75. A set of normally open contacts $61_C$ of relays 61 are connected to a remote signaling device to signal an operator as to which amplifier 51 has failed.

In the normal operative state with tubes 51, 51′ and 51″ functioning properly (i.e., operating as class A amplifiers), the relays 61, 61′ and 61″ are energized and the input and output of each amplifier is connected as shown in FIGURE 3. This comprises a normal feedback, voltage regulated amplifier. The resistors 63, 57 and 71 (or 63′, 57′ and 71, etc.) are designed to bias standby amplifier 53 "off" under these circumstances. If any one of the amplifiers 51, 51′ or 51″ should fail (or even begin to slump in cathode emission as will be shown presently), its plate voltage will rise, causing the voltage at the grid of tube 53 to rise and turn on tube 53. Thus, tube 53 acts as a standby amplifier cross-connected in a bistable switching arrangement with each of the amplifier sections 51, 51′ and 52″. At the same time, the failed tubes plate relay 61 will de-energize, turning "off" the failed amplifier 51 by connecting its grid to a point far below cathode potential through the closing of normally open contacts $61_B$. Also, the corresponding series regulator tube 55 grid is switched to the output of tube 53 which now becomes the feedback amplifier. The diodes 59, 59′ and 59″ serve as an "OR" circuit to couple to the grid of tube 53 only the plate voltage of the failed amplifier 51, 51′ or 51″. Because tube 53's grid voltage is obtained only from the particular resistance divider (consisting of the relay 61, resistance 63, 57, diode 59, and 71) associated with the failed tube, tube 53 will amplify only the voltage feedback from the proper series regulator output. Thus there exists the capability for tube 53 to be switched with any of the tubes 51, 51′ or 51″, the choice being determined automatically only by which one of the latter fails.

The diodes 73, 73′ or 73″ in the plate supply of tube 53 allow its plate voltage to be derived from any of the series regulator outputs.

Since the switching tube 53 occurs automatically, it is important to alert an operator so that the failed tube 51, 51′ or 52″ may be replaced. This alarm is provided by contacts $61_C$ of relay 61, closing when relay 61 deenergizes actuating a lamp or other alarm on a remote operator console.

Obviously many modifications and variations of the present invention are possible in the light of the above teachings. It is therefore to be understood that within the scope of the appended claims the invention may be practiced otherwise than as specifically described.

What is claimed is:

1. In a voltage regulating circuit comprising:
a series regulating tube having an anode, a cathode, and a control grid;
the anode of said regulating tube being connected as the input of said regulating circuit;
a bistable multivibrator connected between the cathode of said regulating tube and ground potential;
said multivibrator having a first and second amplification means therein;
a first diode connected between the control grid and the first amplification means of said multivibrator;
a second diode connected between the control grid and the second amplification means of said multivibrator; and
each of said amplification means of said multivibrator being identical whereby when one of said amplification means fails to operate the other amplification means is automatically switched into operation thus giving automatic maintenance.

2. In a voltage regulating circuit as set forth in claim 1 further comprising a second series regulating tube connected in parallel with said first regulating tube whereby automatic maintenance of said regulating tube is obtained.

3. In a voltage regulating circuit as set forth in claim 1 further comprising a voltage reference tube connected between said amplification means of said multivibrator and ground potential.

4. An automatic maintenance circuit comprising:
a circuit having a plurality of amplifier sections which are to be maintained;
a standby amplifier cross connected in a bistable switching arrangement with each of said amplifier sections, whereby when one of said amplifier sections fails in operation said standby amplifier is automatically switched to an operational amplifier replacing the amplifier that has failed.

5. An automatic maintenance circuit as in claim 4 further comprising a remote signaling means connected to each of said plurality of amplifier sections for remote signaling as to which tube has failed in operation.

References Cited by the Examiner

UNITED STATES PATENTS

| | | | |
|---|---|---|---|
| 2,330,582 | 9/1943 | Hepp | 250—36 |
| 2,624,038 | 12/1952 | Kurshan | 323—20 |

OTHER REFERENCES

Bereskin: Proceeding of the IRE, "Voltage Regulated Power Supplies," vol. 31, No. 2, February 1943, pp. 49, TK5700I7.

LLOYD McCOLLUM, *Primary Examiner*.